Oct. 21, 1958 A. E. SCHWANEKE ET AL 2,857,502
BEVERAGE MAKER
Original Filed June 1, 1954 3 Sheets-Sheet 1
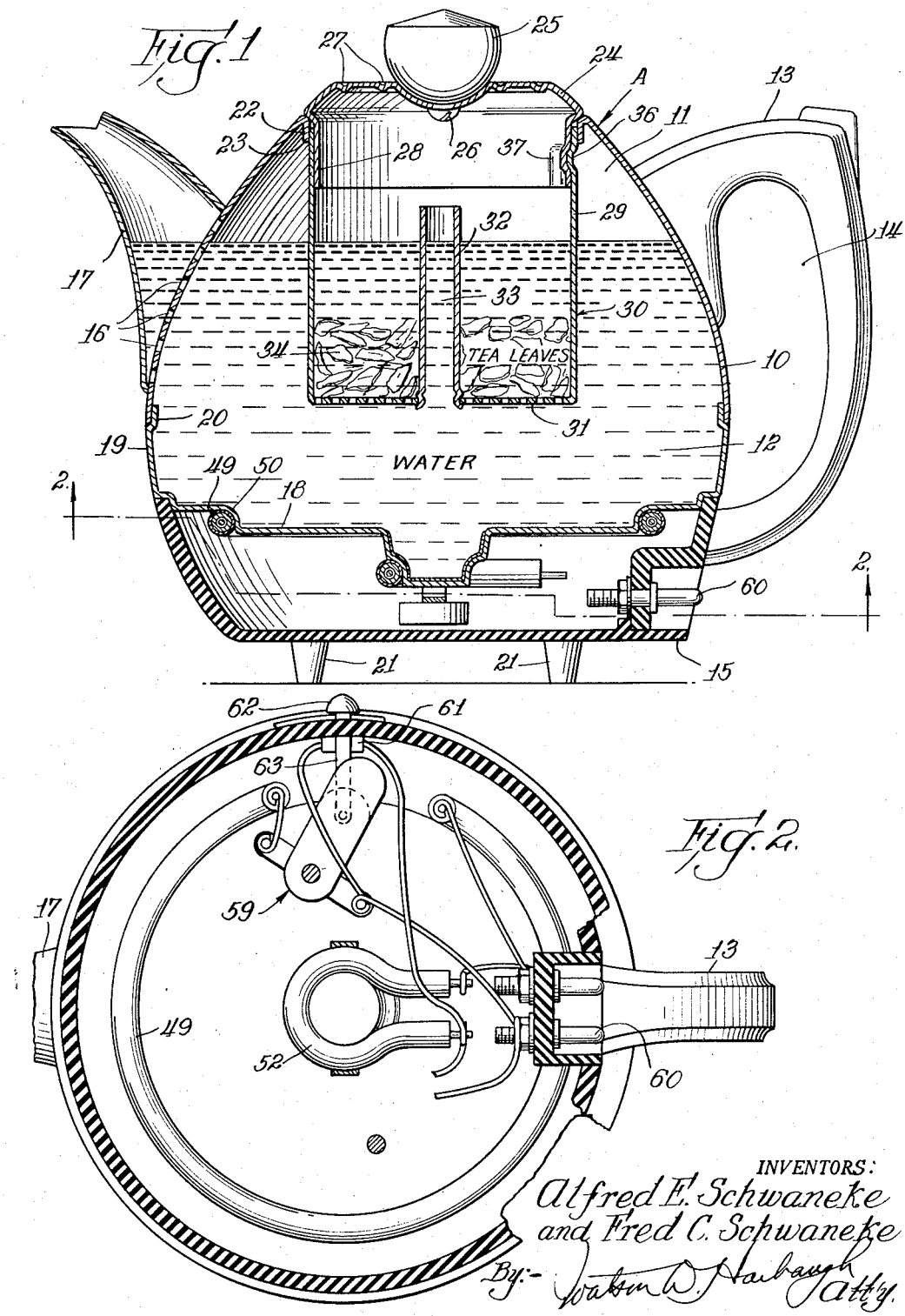
INVENTORS:
Alfred E. Schwaneke
and Fred C. Schwaneke
By:- Watson D. Harbaugh Atty.

Oct. 21, 1958  A. E. SCHWANEKE ET AL  2,857,502
BEVERAGE MAKER
Original Filed June 1, 1954  3 Sheets-Sheet 2
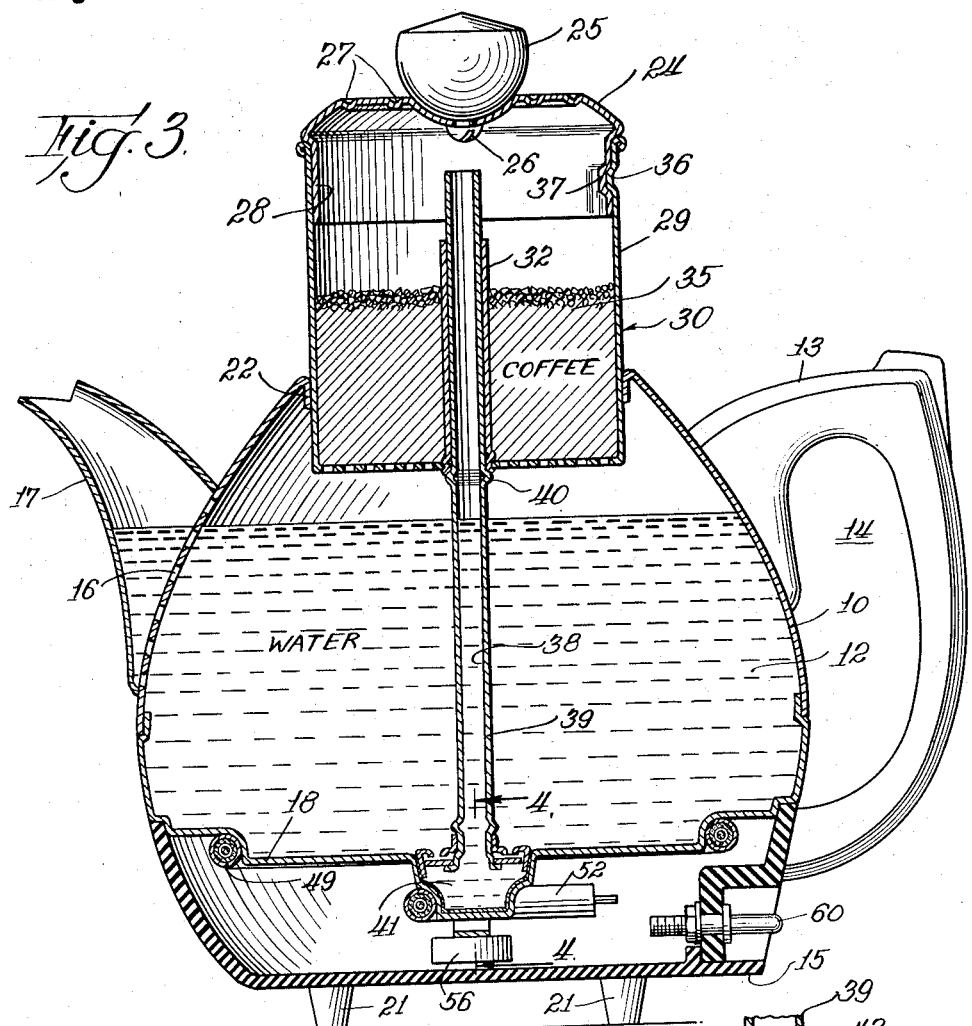
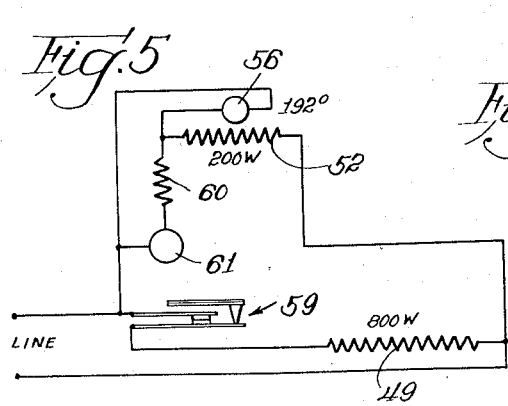
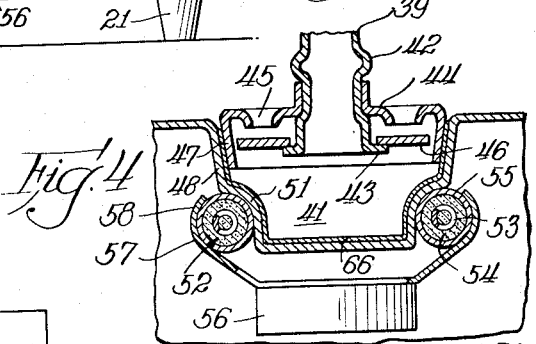
INVENTORS:
Alfred E. Schwaneke
and Fred C. Schwaneke
By: Watson D. Harbaugh
Att'y.

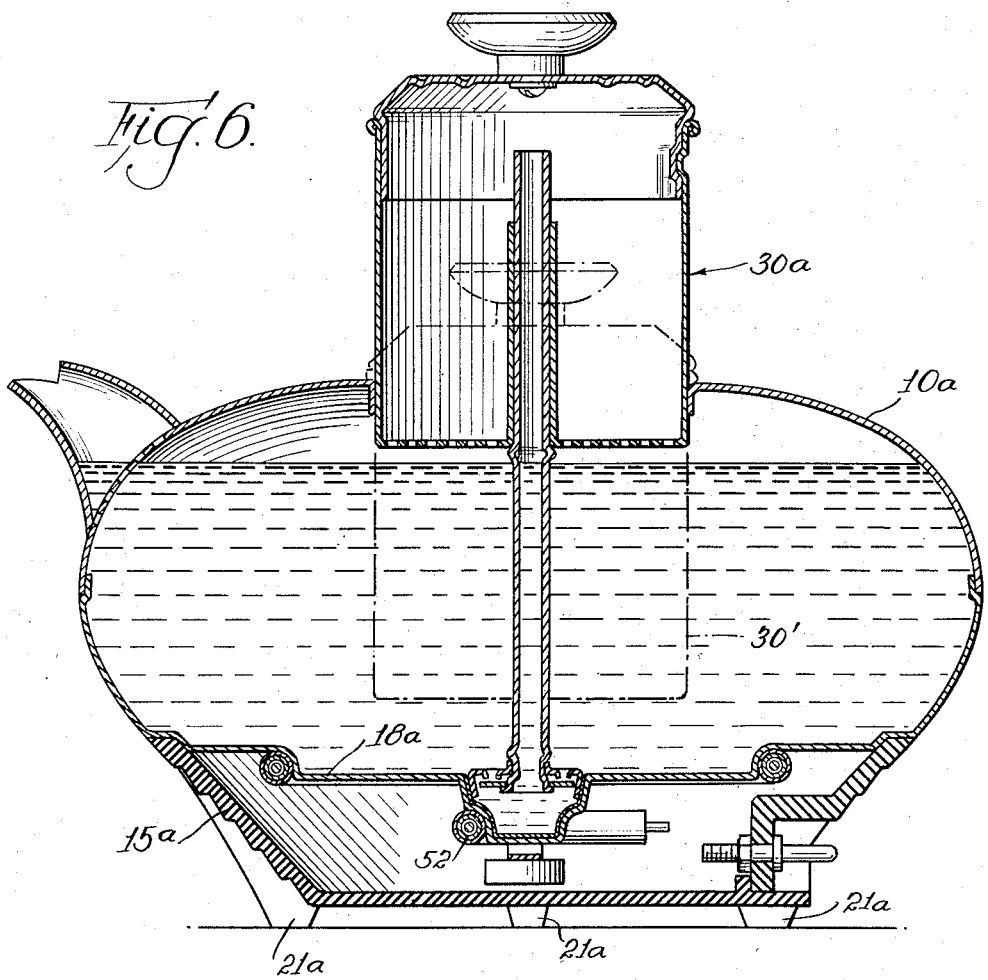
Fig. 6.
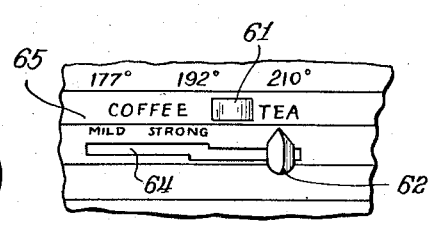
Fig. 9.
Fig. 8.
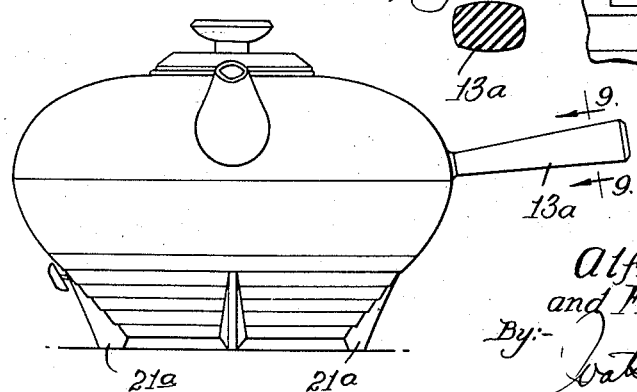
Fig. 7.
INVENTORS:
Alfred E. Schwaneke
and Fred C. Schwaneke

United States Patent Office 2,857,502
Patented Oct. 21, 1958

2,857,502

BEVERAGE MAKER

Alfred E. Schwaneke, Northbrook, and Fred C. Schwaneke, Chicago, Ill., assignors to Dormeyer Corporation, Chicago, Ill., a corporation of Illinois Original application June 1, 1954, Serial No. 433,737. Divided and this application April 11, 1955, Serial No. 500,548

7 Claims. (Cl. 219—44)

This invention relates to a beverage maker, and more particularly to an electric beverage maker of the percolator type suitable for brewing coffee, tea and the like. This application is a division of our application Serial No. 433,737.

In experiments that we have made, it has been established that a better tasting coffee can be brewed in an electric percolator if the temperature of the water is elevated substantially before the pumping or percolating action progresses to any considerable extent. We have found that the duration of the percolating cycle may be substantially independent of the strength of the coffee to be brewed and that the strength can be controlled by regulating the starting temperature of the water prior to any considerable percolation thereof. It is, therefore, desirable to provide an electric beverage maker for percolating coffee in which the water can be heated independently of the percolating thereof and at the same time to provide means for controlling the starting temperature of the water.

As is well known in the percolation of coffee, a liquid pump or percolator is provided that comprises a well which is electrically heated and which communicates with the axial passage through an elongated stem that carries at its top the basket which contains the ground coffee beans. There is a tendency for the walls of the well to have deposits or coffee residue formed thereon. Such residue collections are undesirable for they impede the transfer of heat from the heating element to the liquid within the well. The residue collection is even more serious where a single beverage maker is to be used for making either coffee or tea for it has been found that the coffee residue taints the taste of tea that may be brewed in the maker, and similarly, any tea residue will taint the taste of coffee that may be brewed subsequently.

This has resulted in the use of separate beverage makers for brewing coffee and tea and so far as is known, beverage makers which can be used interchangeably for brewing coffee and tea have not found wide acceptance. Desirably then, a beverage maker of the percolator type which can be used interchangeably as a tea and coffee brewer, must have means provided for quickly and easily eliminating the residue collections that form in the pumping well thereof during a brewing operation.

It is accordingly an object of this invention to provide a beverage maker which can be used alternately and interchangeably for brewing coffee and tea. Another object of this invention is to provide a beverage maker of the percolator type which is arranged to permit quick and effortless cleansing of the percolator well for the removal of residue collections therein. Still another object is in the provision of a beverage maker as described in which the bottom wall of the vessel is provided with a percolator well, the walls of the well being coated with a metal which permits residue collections to be readily removed therefrom. A further object is in providing an electric percolator for brewing coffee and tea and the like and in which the walls of the percolator well are coated with silver; the silver coating being operative to release residue collections thereon when water is heated in the maker with a small amount of detergent added thereto when one of the walls is coated or made of aluminum; the silver coating also having the property of flaking off the residue collections when the percolator well is heated to well above the boiling point of water with no liquid therein.

Still another object of the invention is to provide a beverage maker adapted to either percolate coffee or brew tea in its selective operation and in which means are provided for heating the water to selected predetermined temperatures independently of the percolating operation and before the percolating has progressed to any considerable extent. Yet a further object is to provide an electric percolator having a thermostatically controlled heating element for quickly elevating the temperature of the water within the beverage maker and which is also equipped with a heating coil about the percolating well thereof for bringing about a percolation operation that is independent of the initial heating of the liquid within the beverage maker vessel. An additional object is to provide thermostatic controls in a beverage maker as described that are arranged so that in the brewing of one beverage, such as coffee, the water within the beverage maker can be elevated to selected temperatures independently of the percolating heating element and percolating cycle, the percolating heating element having ultimate control, however; but in which when brewing other beverages, such as tea, the percolating heating element is removed from ultimate control of the cycle and the thermostatic setting of the water heating element will determine the duration of the brewing cycle. Additional objects and advantages will appear as the specification proceeds.

Embodiments of the invention are illustrated in the accompanying drawings, in which—

Fig. 1 is a vertical sectional view of a beverage maker embodying the invention;

Fig. 2 is a transverse sectional view taken on the line 2—2 of Fig. 1;

Fig. 3 is a vertical sectional view of the beverage maker shown in Fig. 1, but in which the percolator pump is in position for operation;

Fig. 4 is an enlarged vertical sectional view taken on the line 4—4 of Fig. 3;

Fig. 5 is a schematic circuit diagram of the electrical circuits and elements in the beverage maker;

Fig. 6 is a vertical sectional view similar to that of Fig. 3, but showing a modified form of beverage maker;

Fig. 7 is a front view in elevation of the beverage maker shown in Fig. 6;

Fig. 8 is an enlarged broken side view in elevation of the adjustable controls for the beverage maker; and Fig. 9 is a sectional view taken on the line 9—9 of Fig. 7.

The beverage maker illustrated in Fig. 1 is designated generally with the letter A and comprises a vessel 10 providing a chamber or compartment 11 therein adapted to receive a liquid 12. The vessel 10 on one side thereof is equipped with a handle 13 which is conventional and which is provided with an open central portion 14, which permits the handle to be gripped tightly between the fingers and palm of a hand. The handle 13 may be secured to the vessel 10 in any suitable manner, and, for example, as is customary, cap screws may be used but are not shown in the illustration. Preferably, the lower arcuate portion of the handle 13 is secured directly to an insulating base member 15 as shown, which carries the vessel 10. On the side of the vessel 10 opposite the handle 13, the wall thereof is provided with a plurality of apertures 16 therethrough and a spigot or spout 17 is secured to the wall of the vessel about the apertures 16. It will be appreciated that the spout 17 is used in pouring the liquid 12 from the vessel.

If desired, the side walls of the vessel 10 may be formed from a material that is different than the material used in forming the bottom wall 18. It would be appreciated that it is desirable to provide a bottom wall 18 that is a good conductor of heat so that the heat provided by the heating elements, which will be described subsequently, is transferred directly and with a minimum loss to the liquid 12 of the vessel. For example, the bottom wall 18 may be formed of plated copper or aluminum, while the side walls of the vessel may be stainless steel or sheet steel that is chromium plated.

In the specific illustration given, the bottom wall 18 provides an upwardly turned flange portion 19 equipped with a tongue 20. The tongue 20 is offset and is rigidly secured to the bottom edge of the vessel side walls by any suitable means, such as welding. The bottom wall 18 rests upon and is rigidly secured to the base member 15 which is equipped with a plurality of feet 21, which are adapted to rest upon a table top or similar support and to support the base 15 thereabove. The base 15 is preferably formed from plastic that conducts heat slowly so that there will be little dissipation of the heat within the vessel 10 and of the liquid 12 by transfer through the base member.

The vessel 10 is provided at its top with an inwardly and downwardly turned annular flange 22, which defines a central opening 23. The opening 23 is adapted to be closed by a removable top or cover 24 which is equipped with a knob or handle 25 for that purpose. The knob 25 may be secured to the top 24 by cap screws 26. The annular grooves 27 about the surface of the cap 24 are provided for ornamental purposes. The knob 25 should be a heat insulator so that it can be held without burning one's fingers.

As is shown in Figs. 1 and 3, the cover 24 is equipped with a depending annular wall 28, which is substantially parallel to the flange 22, but is spaced inwardly therefrom. The space formed between the wall 28 and flange 22 is adapted to receive therein the vertical wall 29 of a basket member 30 which has a perforated bottom wall 31 equipped with an inwardly and vertically extending stem portion or sleeve 32 having a passage 33 therethrough. The stem portion 32 at its lower end may be crimped or otherwise rigidly secured to the bottom wall 31 of the basket. It is clear from the illustration in Fig. 1 that the basket 30 is adapted to receive tea leaves 34 therein, or as shown in Fig. 3, is adapted to receive ground coffee 35 therein.

In the making of tea, the beverage maker A does not function as a percolator and the basket 30 is inserted into the vessel and sits within the liquid 12 as is shown in Fig. 1. Means must be provided to maintain the basket 30 in a position above the bottom wall 18 of the vessel as is shown in Fig. 1, and this is accomplished by equipping the vertical wall 29 of the basket with an inwardly extending rib 36 that is frictionally received within a complementary L-shaped groove or recess 37 formed in the vertical wall portion 28 of the cover. The rib and recess frictionally lock the basket and cover together so that they can be inserted and removed as a unit from the vessel 10. It will be clear that the cover and basket may be separated by threading the rib 36 through the L-shaped channel 37.

However, in the making of coffee the beverage maker A operates as a percolator and the liquid 12 within the vessel is forced upwardly through a longitudinally extending passage 38 formed through an elongated stem 39 that at its upper end portion is equipped with an outwardly extending annular bead 40 which is adapted to abut and support the basket 30 when the stem 39 is slidably inserted into the sleeve or stem portion 32 of the basket. It is clear from Fig. 3 that in the brewing of coffee the basket 30 is supported so that the upper portion thereof extends upwardly and outwardly above the vessel 10. Upon the termination of a coffee brewing operation, the basket 30 and stem 39 may be removed from the vessel and the cover 24 placed over the opening 23.

The stem 39 is adapted to communicate at its lower end with a well 41 which is formed in the bottom wall 18 of the vessel, preferably as shown most clearly in Fig. 4, the bottom end portion of the stem 39 is equipped with an outwardly extending bead 42 and therebelow and spaced therefrom is an outwardly extending flange 43. A screen member 44 is secured to the stem 39 between the bead 42 and flange 43 and is provided with a plurality of apertures 45 therethrough which permit liquid to flow from the vessel and into the well. Most desirably, the screen 44 is spaced above the flange 43 and a washer or seal member 46, normally carried by the flange 43, is free to move upwardly about the stem and into close relation with the apertures 45. The washer and screen cooperate in permitting liquid to flow from the vessel into the well, but prevent the flow of liquid in the opposite direction since an increase in the pressure of the liquid within the well will force the washer 46 forwardly and against the screen 44. As can be seen in Fig. 4, the screen 44 has a downwardly and inwardly inclined annular flange 47 which is adapted to be received within the inclined walls 48 that define in part the well 41.

A heating element 49 is carried in heat exchange relation with the wall 18 of the vessel and adjacent the outer edge thereof. If desired, the heating coil or element 49 may engage an arcuate shoulder portion 50 provided by the bottom wall and which furnishes an enlarged heat exchange surface for the heating element. Similarly, the well 41 and specifically the wall 48 thereof, is equipped with an arcuate shoulder 51 which is in engagement with a heating coil or element 52 which surrounds the wall in the area thereof of the shoulder 51. The heating coil 52 and the heating coil 49 may be wholly conventional and may be provided by an inner conductor 53 which is enclosed by an insulator 54, which in turn carries a sleeve 55. The sleeve 55 may be metal and may be spot-welded, or otherwise rigidly secured to the wall 48.

A thermostatic control for the heating element 52 is provided adjacent thereto and may take the form of a conventional disc type snap action thermostat 56, as shown and which are frequently referred to as a "Klixon" switch. The thermostat 56 is rigidly carried by a clip 57 which has arcuate wall portions that snap onto the sleeve 55 provided by the heating element 52. A thermostat 59 is provided for controlling the heating element 49 and it will be mounted in good heating exchange relation with the bottom wall 18 of the vessel 10 a spaced distance from the element 49. The base member 15 will be equipped with the electric plug 60.

The circuit for the heating elements and thermostats is shown schematically in Fig. 5 and it is seen that the primary heating element 49 is connected in series with the thermostat 59 which is adjustable. The heating element 49 has a relatively large capacity such as, for example, 800 watts, so that it can elevate the temperature of the liquid within the vessel rather quickly. In parallel with the heating element 49 is the heating element 52, which is arranged about the well 41 for heating the liquid therein. The element 52 may be of smaller capacity than the element 49 and, as an example, may be about 200 watts. In series with the heating element 52 is the thermostat switch 56 and as is clear from Fig. 5, the heating element 52 and thermostat 56 in series therewith, are together in parallel with the series arrangement of heating element 49 and thermostat 59. Paralleling the thermostat switch 56 is a relatively high resistance 60' which has in series therewith an indicator light 61. The position of the light 61 is illustrated best in Figs. 2 and 8. It is also clear from Figs. 2 and 8 that the thermostat 59 is equipped with a control pointer 62 which has connected thereto an arm 63 that slides through a slot 64 in a wall portion of the base 15. A scale 65 may be formed along the slot 64 and may have indicia that indicates the proper setting for the brewing of mild and strong coffee, as shown, or for brewing tea.

Also shown most clearly in Fig. 4 is a coating or sheath 66 that is formed along the inner surface of the wall 48 of the percolator well 41. The sheath or coating 66 should be formed from some dense material that will give up or release coffee and tea deposits, that form thereon, when water and a detergent or other electrolyte are heated within the vessel, or alternatively, when the wall 48 of the well is heated by the heating element 52 when the well is dry and without a liquid therein. I have found that silver has these properties and prefer to use it for the sheath 66. However, other metals might be employed and especially gold, platinum and copper which fall within substantially the same grouping as silver in the electromotive series.

In the modification shown in Figs. 6 and 7, the beverage maker is substantially the same as that heretofore described except that the physical configuration of the vessel 10a and base 15a and also the handle 13a are somewhat different. Also the feet 21a extend downwardly along the side walls of the base 15a, but perform the same function as the feet 21 described before. The essential difference in the modification of Figs. 6 and 7 is that the vessel 10a is wider and somewhat more squat than the vessel 10 shown in Figs. 1 through 3. The purpose of the shallower vessel 10a is to permit the basket 30a to be positioned closer to the bottom wall 18a during the brewing of tea. The position of the basket 30a when tea is being brewed is illustrated by the dotted lines shown in Fig. 6 and which are designated with the numeral 30'. With this arrangement a smaller quantity of tea can be brewed at any time because the basket is positioned closer to the bottom wall 18a and less liquid is required within the vessel to cover the bottom end portion of the basket and tea leaves which are contained therein. Moreover, the central heating element 52 being directly below the basket, the water circulation pattern is favorable to moving the water through the tea leaves. In other respects the modification is substantially identical to the structures heretofore described and a further description of the modification in detail is believed unnecessary and will not be included.

*Operation*

In using the beverage maker for brewing coffee, the required quantity of water is placed within the vessel 10, the stem 39 is inserted into the well 41 and the basket 30, with the required amount of coffee therein, is positioned upon the stem with the cover 24 enclosing thereabout, all as shown in Fig. 3. The plug 60 is then connected to a suitable electric outlet and the knob 62 is positioned on the scale 65 as desired to make either strong or mild coffee.

As is clear from the circuit diagram in Fig. 5, the heating coil 49 is energized and the liquid within the vessel is quickly raised to an elevated temperature thereby. If the knob 62 and thermostat 59 are positioned at the mild point along the scale 65, the temperature of the water within the vessel will be raised to about 177° F. before the thermostat 59 opens. If, however, the knob 62 is positioned adjacent the strong point on the scale 65, the water will be raised to a temperature of about 192° F. before the thermostat 59 opens and the heating element 49 is de-energized. The thermostat 59 is completely conventional and may comprise the usual bimetallic elements.

Simultaneously with the energization of the heating element 49 the circuit through the heating element 52 and switch 56 in series therewith will be completed. At this time only a minimum flow of current will be provided through the relatively high resistance 60' and the light 61, and the light then is not lit. The switch 56 is preferably not adjustable and will be set to break the circuit through the heating element 52 when the temperature of the liquid 12 within the vessel 10 is slightly below the boiling temperature of water. Initially then, the water within the well 41 will be pumped upwardly through the stem 39 and will flow out of the passage 38 and downwardly through the coffee within the basket and outwardly through the perforated bottom wall 31 of the basket. At the same time the heating element 49 will quickly elevate the temperature of the water to the value for which the thermostat 59 is set.

When the water within the vessel reaches the selected predetermined temperature, the heating coil will be de-energized and the percolating cycle will continue independently thereof and for substantially a predetermined time which is determined by the setting of the thermostat switch 59. If mild coffee is being made, the percolation cycle will have substantially the same duration as when a strong coffee is being brewed and the difference in coffee strength will be primarily attributed to the temperature to which the water is elevated by the heating coil 49. Stronger coffee will be brewed when the starting temperature of the water is at a higher elevation. If desired, after the percolating cycle has terminated, the stem 39 and basket 30 can be removed from the vessel and the cover 24 can be placed over the opening 23. The indicator light 61 will glow when the circuit through the heating element 52 and the switch 56 is broken. The coffee will be maintained at an elevated temperature for when the temperature of the liquid within the vessel falls below the temperature for which the thermostatic switch 56 is set, the switch will close and the circuit through the heating element 52 will be completed and the heat developed thereby will heat the coffee within the vessel.

If tea is to be brewed in the beverage maker, water is added to the vessel and tea leaves are placed within the basket 30. The basket with the cover 24 thereon is then set into the vessel as shown in Fig. 1. The plug 60 is connected to an electric outlet and the control knob 62 for the thermostat 59 will be swung into alignment with the tea indicia on the scale 65, as shown in Fig. 8. Both the heating element 49 and heating element 52 will be energized and the water within the vessel heated. The heating element 52 will be de-energized first for when the knob 62 is set at the tea making position the thermostat 59 will be set to open at a temperature of about 210° F. Therefore, during a tea making operation, the heating element 49 and thermostat 59 will control the duration of the brewing cycle.

As has been brought out before, it is desirable to cleanse the walls of the well 41 of all residue when tea is to be made after the brewing of coffee and vice versa. This can be accomplished readily with a pot having an aluminum wall or coating by placing water within the vessel and adding about a teaspoonful of commercial detergent thereto and then heating the water. Apparently, an electrolytic cell action is provided and the detergent acts as the electrolyte. In any event, upon heating the detergent and water within the vessel it has been found that the silver sheath about the walls of the well 41 are cleansed of the residue that has formed thereon.

An alternative and highly unusual procedure may be used to cleanse the well in place of the water and detergent described when there is no aluminum present. The beverage maker may be completely emptied and the plug 60 connected to an electric outlet. The heating element 52 will quickly raise the temperature of the walls of the well well above the boiling point of water and it has been found that this will cause the residue clinging to the silver coating to flake off. The beverage maker will not be damaged in any way, for when the temperature of the well walls reaches the temperature setting of the thermostat 56, the heating element 52 will be de-energized. The same is true of the heating element 49 and the bottom wall 18 of the beverage maker with which it is in thermo contact.

While in the foregoing specification embodiments of the invention have been set out in considerable detail for purposes of illustration, it will be apparent to those skilled in the art that considerable change in these details may be made without departing from the spirit of the invention.

We claim:

1. In an electric beverage maker having a vessel equipped with a bottom wall having a well portion therein, a heating element in heat exchange relation with a main portion of said vessel, an adjustable thermostat for said heating element and being arranged in series therewith, a second heating element in heat exchange relation with the well portion of said bottom wall, said second heating element being substantially independent of the operation of said first heating element, a thermostat for said second heating element and being arranged in series therewith, said vessel being provided with a liquid pump comprising said well formed by said wall portion and a stem extending upwardly therefrom, valve means connecting said main portion and said well portion constructed to admit liquid from said main portion to said well portion and continuously prevent passage of liquid from said well portion to said main portion, and an indicator light arranged in parallel with said last mentioned thermostat, said first mentioned thermostat being adjustable through a range of temperatures extending both below and above the temperature of said second mentioned thermostat.

2. In an electric beverage maker having a vessel with a main portion and a well portion in the bottom thereof normally in communication with the main portion, a high wattage heating element in heat exchange relation with the main portion of said vessel independently of said well portion, an adjustable thermostat for said high wattage heating element arranged in series therewith and disposed in heat responsive relationship with the main portion, a second heating element in heat exchange relation with the well portion, a second thermostat for said second heating element arranged in series therewith and disposed in heat responsive relationship with the well portion, said second heating element and second thermostat being connected in parallel with said high wattage heating element and adjustable thermostat for independent operation, a percolating pump means removably received in said well portion providing intermittent communication between said main and well portions and including a tube extending upwardly therefrom, and a valve interconnecting said main portion and said wall portion constructed to admit liquid from said main portion to said well portion and obstruct passage of liquid from said well portion to said main portion except through said tube, said adjustable thermostat being adjustable through a range of temperatures which extends both below and above the temperature of said second thermostat.

3. In an electric beverage maker providing a vessel adapted to receive liquid therein having a main portion and a well portion normally in liquid communication with each other, and an electric heating element in heat exchange relation with the wall of said main portion, an electric heating element in heat exchange relation with said well portion thereof, circuit means for connecting said heating elements in parallel with each other, adjustable thermal responsive control means in series with said first mentioned heating element operative to interrupt the circuit therethrough when liquid within said main portion has been heated to a substantially predetermined temperature, second thermal responsive control means in series with said second mentioned heating element for interrupting the flow of current therethrough at a predetermined temperature of liquid in the well portion whereby said electric heating element in heat exchange relation with said well portion is substantially independent of the operation of said electric heating element in said heat exchange relation with the main portion, and removable pump means including a valve connecting said main portion and said well portion intermittently and constructed to admit liquid from said main portion to said well portion and continuously obstruct passage of liquid from said well portion to said main portion, said adjustable control means being adjustable through a range of temperatures extending both above and below the temperature of said second control means.

4. The structure of claim 3 wherein the first mentioned control means is an adjustable thermostat mounted in heat exchange relation with a wall of said main portion and connected in series circuit with said first mentioned heating element.

5. The structure of claim 3 wherein the last mentioned control means is a fixed temperature thermostat connected in series with said second mentioned heating element and disposed in heat exchange relation with the liquid contents of the well portion to interrupt the flow of current therethrough when the liquid within said well portion reaches a predetermined temperature.

6. In an electric beverage maker having a vessel provided with a main portion and a well portion in the bottom thereof normally in liquid communication with each other and an opening at the top, a basket receivable within said main portion through said opening and having a perforate bottom, a high wattage heating element in heat exchange relation with the main portion of said vessel, an adjustable thermostat for said high wattage heating element arranged in series therewith and disposed in heat exchange relationship with the main portion, a second heating element in heat exchange relation with the well portion, a second thermostat for said second heating element arranged in series therewith and disposed in heat exchange relationship with said well portion, said second heating element and second thermostat being connected in parallel with said high wattage heating element and adjustable thermostat for mutually independent operation, a percolating pump means removably received in said well portion providing intermittent communication between said main and well portions and including a tube extending upwardly therefrom for supporting the basket with a major portion thereof above said opening, and a valve interconnecting said main portion and said wall portion constructed to admit liquid from said main portion to said well portion and obstruct passage of liquid from said well portion to said main portion except through said tube, said adjustable thermostat being adjustable through a range of temperatures which extends both below and above the temperature of said second thermostat.

7. In an electric beverage maker having a vessel providing a bottom wall equipped with a well opening into said vessel and being adapted to receive a percolating pump assembly therein, a first heating element in heat exchange relation with said bottom wall, an adjustable thermostat disposed in heat exchange relation with said bottom wall and being connected with said heating element for controlling the flow of current therethrough, a second heating element in heat exchange relation with said well, and a thermostat disposed in heat exchange relation with said well and being connected with said second heating element to control the flow of current therethrough, said adjustable thermostat being adjustable through a temperature range that extends both above and below the temperature setting of said second thermostat, said first and second heating elements being connected so as to define a parallel circuit arrangement affording independent energization of each.

(References on following page)

References Cited in the file of this patent

UNITED STATES PATENTS

| | | |
|---|---|---|
| 2,175,727 | Graham | Oct. 10, 1939 |
| 2,658,134 | Kircher | Nov. 3, 1953 |
| 2,694,770 | Sullivan | Nov. 16, 1954 |
| 2,696,159 | Marquis | Dec. 7, 1954 |
| 2,712,055 | Campbell | June 28, 1955 |
| 2,730,610 | Farr | Jan. 10, 1956 |
| 2,754,399 | Edman | July 10, 1956 |
| 2,763,767 | Lohrman et al. | Sept. 18, 1956 |
| 2,798,143 | O'Brien | July 2, 1957 |

FOREIGN PATENTS

| | | |
|---|---|---|
| 163,228 | Australia | June 6, 1955 |